July 4, 1961 C. F. NIELSEN 2,990,785
PUMPING SYSTEM FOR TRUCK TANKS
Filed July 11, 1958 2 Sheets-Sheet 1

INVENTOR.
CARL F. NIELSEN
BY Carlsen & Hayle
ATTORNEYS

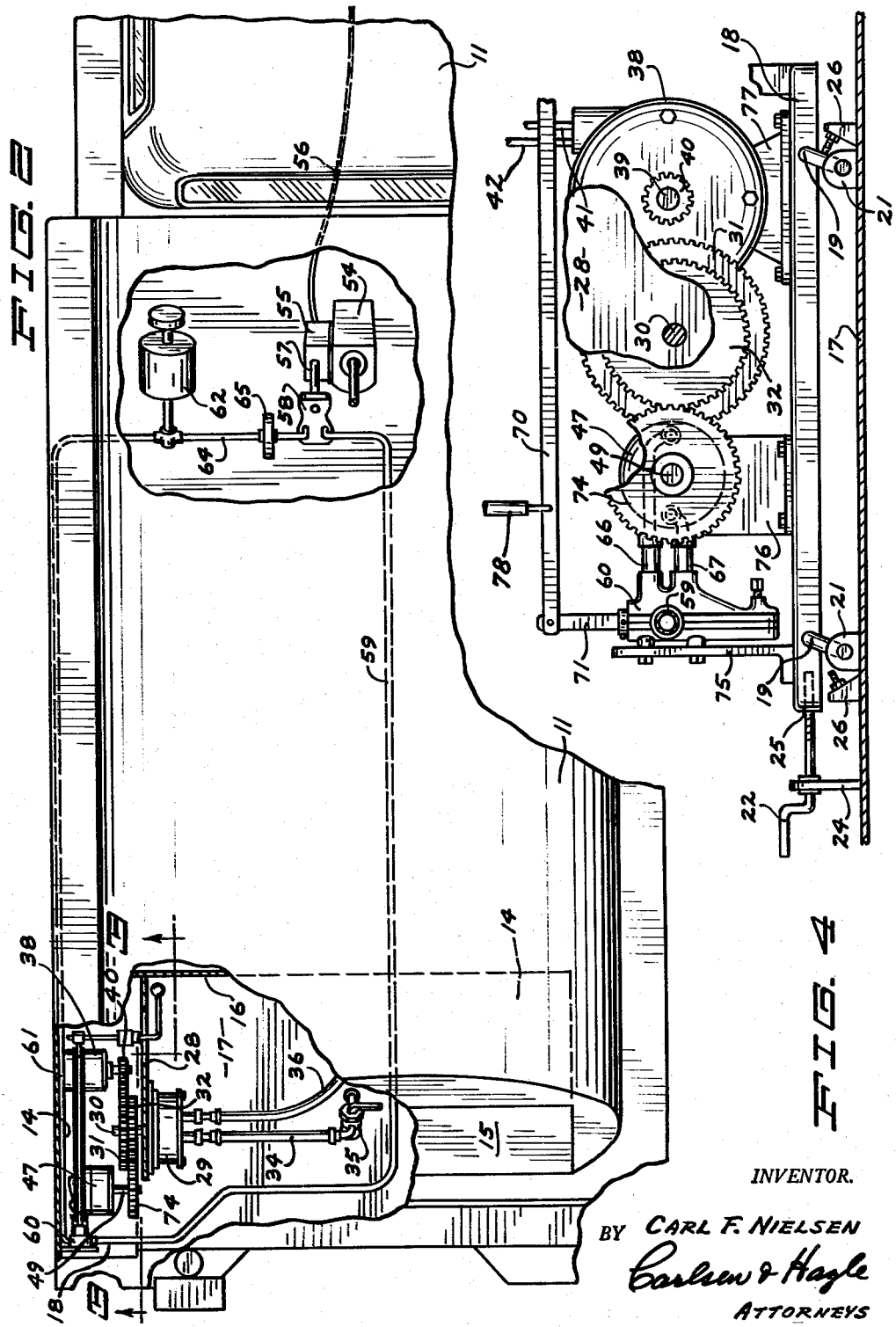

United States Patent Office 2,990,785
Patented July 4, 1961

2,990,785
PUMPING SYSTEM FOR TRUCK TANKS
Carl F. Nielsen, 1307 8th Ave. N., St. Cloud, Minn.
Filed July 11, 1958, Ser. No. 747,985
4 Claims. (Cl. 103—207)

This invention relates generally to vehicle mounted tanks of the type used to carry milk or other liquid in bulk, and more particularly concerns a new and improved pumping system for transferring the liquid into or out of the tank.

It has become a common practice in milk collection for the dairy farmer to have a refrigerated bulk milk tank for temporary storage of milk. This tank is periodically emptied into a pick-up tank truck operated by the milk processor which transports the milk to milk plant or creamery for processing. In transferring the milk from the bulk tank to the truck tank a hose connected to the truck tank is attached to the bulk tank and the milk is drawn through the hose through operation of a pump mounted on the vehicle. To discharge the milk from the truck tank the hose is connected to the plant storage tank or to a larger truck tank as the case may be and the pump is operated in reverse to remove the milk therefrom.

The truck tank pump is normally mounted along with the hose in a pump compartment provided at the side or rear of the tank and may be either a centrifugal or positive gear type. It is with operation of the pump that the present invention is concerned. Normally the pump is driven by a vehicle mounted electric motor which is connectible to any convenient electric outlet. While this is satisfactory under most conditions, the pump is, of course, inoperable in the event of a power failure. Furthermore, there is normally no electric power source available when it is desired to transfer milk from one truck tank to another on the highway.

The provision of an auxiliary gasoline engine on the truck for use in case of a power failure is unsatisfactory because of the size, starting and fume problems associated therewith. The operation of the pump from the vehicle engine has been used before, but only as a sole means of pump operation.

The primary object of the present invention is to provide a pumping system for vehicle mounted tanks wherein the pump can be selectively driven from either an electric motor connected to an outside source or from the vehicle engine.

A more specific object of the invention is to provide a reversible pump for a vehicle mounted liquid tank which is selectively operable either by a reversible electric motor or a reversible hydraulic motor, the latter of which is driven from the vehicle motive engine and wherein said two motors have a common control for the shifting therebetween forward and reverse operation.

Still another object of the invention is to provide a vehicle tank pumping system wherein the pump may be driven from either an electric motor or a hydraulic motor and wherein there is provided a new and improved means for selectively placing either motor in driving engagement with the pump.

The above and additional objects of the invention will be brought to light during the course of the following specification, reference being made to the accompanying drawings, in which—

FIG. 2 is a plan view of the truck tank from above, the rear end of the tank being broken away to show certain parts of the pumping system, and with a front portion of the tank broken away to show other components of the system in perspective.

FIG. 4 is similar to FIG. 3 but shows the tank pump driven by the hydraulic motor.

With the above mentioned objectives in mind the invention broadly comprises a pumping system for a liquid carrying tank which is mounted on a vehicle having a motive engine which comprises a liquid pump connected to the tank, an electric motor on the vehicle adapted to be connected to an outside source of electrical power, a hydraulic system on the vehicle including a hydraulic motor, the hydraulic system having operative connection with the motive engine to drive the hydraulic motor, and there being selectively engageable drive means between each motor and the pump for operation of the pump from either motor. The pumping system is further characterized by providing that the pump and both motors be reversible in operation enabling the pump to transfer liquid into or out of the tank and with a single control for shifting both motors between forward and reverse operation.

Figure 1:
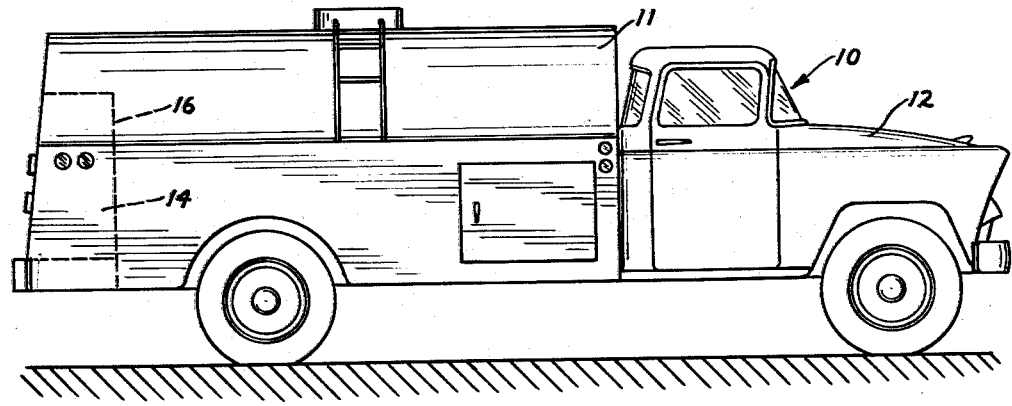
FIG. 1 is a side elevation of a pick-up tank truck of the type on which the present invention is used.

Referring now more particularly to the drawings reference characters will be used to denote like parts or structural features in the different views. FIG. 1 shows a milk pick-up tank truck 10 on which is mounted a liquid tank 11. The truck is provided with a conventional motive engine at its front end disposed under the hood 12.

At its rear end the tank 11 is provided with a separate compartment 14 for carrying the tank pumping mechanism, hoses, etc. This compartment is accessible through rear doors 15. The rear wall of the tank proper forms the front wall of compartment 14 and is designated at 16. The floor of the compartment is denoted at 17 and supports the pump operating mechanism now to be described, reference being particularly made to FIGS. 3 and 4.

A base or platform 18 is mounted on the floor 17 of the compartment for longitudinal adjustment thereon. This is accomplished by providing a pair of cross rods 19 journaled transversely through the platform with eccentrically disposed terminals 20 journaled in the bearing blocks 21 on the floor 17. A crank 22 rotatably mounted in the upright support 24 has a screw threading engagement with an internally threaded end portion of the platform 18 as at 25. Accordingly, crank 22 may be operated to move the platform forwardly or rearwardly the rods 19 following the platform limited swinging about the axes 20. A pair of stops 26 engageable by the crank portions of the rods 19 limit the longitudinal adjustment of the platform. Sufficient vertical play of the crank 22 in support 24 may be allowed for the slight vertical movement of platform 18 during its longitudinal adjustment between positions.

A partition wall within the pump chamber is designated by the number 28 (FIG. 2). This wall supports a reversible rotary fluid pump 29, which is driven by shaft 30 extending through the wall 28. A pair of gears 31 and 32 of different diameters are coaxially keyed on the shaft 30. Accordingly, as either gear 31 or 32 is driven the pump 29 will be operated to force fluid therethrough. A fluid flow line 34 connects pump 29 to the interior of the tank through a tank mounted shut-off valve 35. A second line or hose 36 of extended length has one end connected to the pump. Hose 36 is normally coiled within the pump compartment when not in use, its extended end adapted for connection with a remote farm bulk tank or the like for carrying fluid to or from the truck tank 11. The tank 29 and gears 31 and 32, being mounted on the partition 28, obviously do not move with the platform 18.

Figure 3:
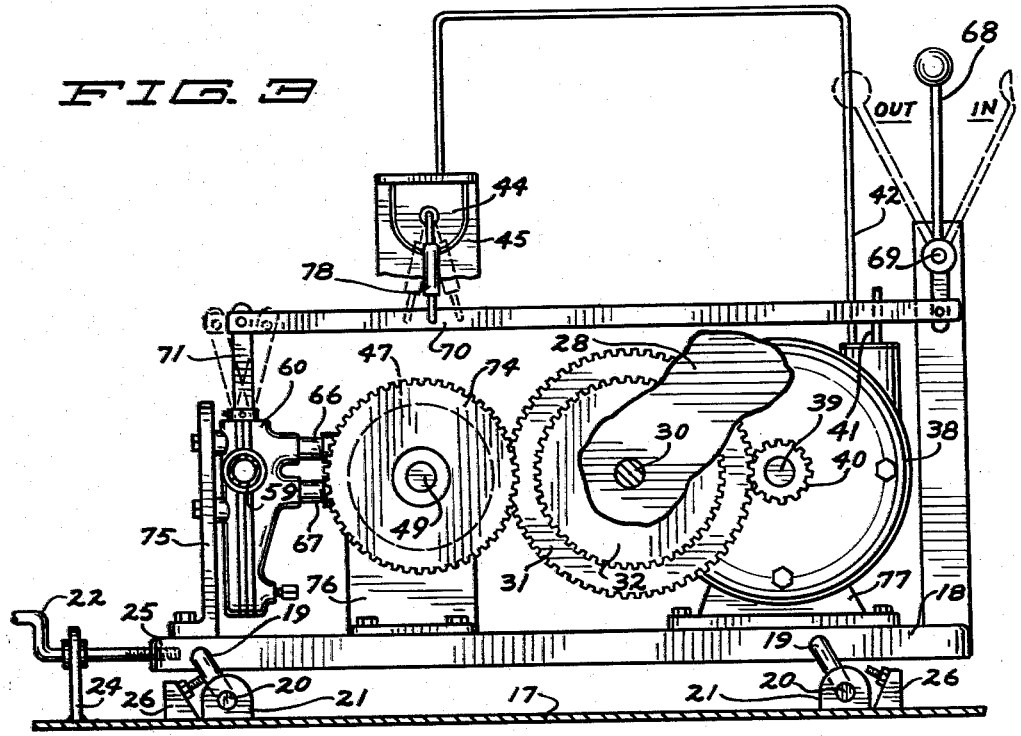
FIG. 3 is a side elevation of the mechanism located in the tank pump compartment for operating the tank pump and showing the pump being driven by the electric motor.

A reversible electric motor 38 is mounted on the forward portion of the platform 18 with the motor drive shaft 39 carrying a driving gear 40 which lies on the longitudinal vertical plane of gear 31 for intermeshing engagement therewith when the platform 18 is in rearward adjusted position as shown in FIG. 3. The motor has an electric power supply line 41 adapted to be connected to an external source of electric power. Motor 38 is also connected by electric line 42 to a reversing switch 44 carried by an upright support 45 mounted on the platform 18. The operation of switch 44 will be later described in greater detail.

Also mounted on the platform 18 and rearwardly of the motor 38 is a reversible rotary hydraulic motor 47 (FIG. 2) which is supported by bracket 76. This motor drives a shaft 49 which carries drive gear 74 disposed on a longitudinal vertical plane with gear 32 to come into meshing engagement therewith when the platform 18 is adjusted to a forward position (FIG. 4).

Motor 47 is driven from the vehicle engine in a manner now to be described with particular attention to FIG. 2. Number 54 represents the vehicle transmission which has a power take-off unit 55 associated therewith. A control cable 56 extends from the power take-off unit 55 to the vehicle dashboard or some other suitable place adjacent the driver's station. Through cable 56 the unit 55 is thrown into or out of driven engagement with the transmission 54. Unit 55 has a rotary shaft 57 which drives a hydraulic pump 58 disposed in a closed hydraulic fluid circuit. The circuit also includes a fluid line 59 extending from pump 58 to a valve 60 to be later described, a return line 61 from valve 60 to a fluid reservoir 62, and a line 64 from the reservoir 62 to pump 58, the line 64 incorporating a hydraulic fluid filter 65.

Accordingly, as pump 58 is operated fluid under pressure is constantly passing through the circuit from the reservoir 62 through pump 58, and valve 60 and back to the reservoir. Valve 60 is connected to the motor 47 through lines 66 and 67. This is a conventional three-way valve which is operated by a control 68 pivoted on a platform mounted support as at 69 and connected to the valve by an elongated link 70 which connects the control to the valve actuating arm 71.

When control 68 is in neutral position as in FIG. 3 the valve 60 is in by-pass position so that fluid in the circuit passes directly through the valve from line 59 to line 61 by-passing the fluid motor 47. When control 68 is shifted to a forward position, the valve 60 is adjusted to admit fluid through conduit 66 to motor 47 to drive the motor 47 and a gear 74 operated thereby in one direction. Conversely, when the control 68 is shifted to a rearward position, valve 60 is adjusted to pass the circuit fluid in a reverse direction through the motor 47 to drive gear 74 in the opposite direction.

The valve 60, fluid motor 47, and electric motor 38 are mounted on platform 18 by brackets 75, 76, and 77 respectively, so that these components move as a single unit when the platform 18 is adjusted in fore and aft directions under operation of screw 22. A length extensible switch arm 78 controls the switch 44 and has its extended end pivotally connected to link 70. The switch is in an "off" position when centered as shown in FIG. 3. When control 68 is moved to a forward or "in" position, arm 78 swings to the left to close the electrical circuit to operate motor 38 so as to drive the pump 29 in a direction to pump liquid into the tank through line 34. Conversely, movement of control 68 to a rearward or "out" position swings the arm 78 forwardly to reverse the motor 38 with resultant pumping of liquid out of the tank.

It will be understood that for normal operation the electric motor is used to drive the pump, the line 41 being connected to an outlet in the milk house or other convenient place. The platform 18 is then in a rearward position with the drive gear 40 and driven gear 31 in intermeshing engagement. Control 68 will be moved forwardly and pump 29 will be driven to draw milk inwardly through the hose 36 and then into the tank 11 through hose 34.

In the event of a power failure or lack of available electric current from an outside source, the platform 18 is adjusted forwardly to throw gear 74 into intermeshing engagement with gear 32, as shown in FIG. 4. Power take-off 55 is then thrown into engagement with the vehicle motive engine and the hydraulic circuit is put into operation to drive the motor 47, and through gears 74 and 32, the pump 29 in the desired direction.

Accordingly, the structure disclosed provides a dual power source for driving the pump 29, with a ready means for throwing the pump into driven engagement with either source. Moreover the pump is readily reversible for selectively pumping liquid into or out of the tank with the reversing operation facilitated by a single control regardless of which power source is in operation.

The invention accordingly economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a pumping system for a liquid carrying tank mounted on a vehicle having a motive engine, a two-way liquid pump connected to the tank for pumping liquid into or out of the tank, an electric motor mounted on the vehicle, a hydraulic system on the vehicle including a hydraulic motor, pump means in the hydraulic system operated by the motive engine for forcing fluid through the system to drive the hydraulic motor, means for selectively connecting said two-way pump to either the electric motor or the hydraulic motor for operation thereby, said means comprising a driven means on the two-way pump, drive means on the electric motor, drive means on the hydraulic motor, and a platform adjustably mounted on the vehicle and carrying both motors for selective engagement of one drive means or the other with the driven means through adjustment of the platform.

2. In a pumping system for a liquid carrying tank mounted on a vehicle having a motive engine, a rotary liquid pump mounted in fixed position on the vehicle and having an open connection with the interior of the tank, a gear member mounted coaxially on the pump, an elongated platform adjustably mounted on the vehicle for adjustment between various longitudinal positions under said gear member, an electric motor mounted on the platform at one side of the gear member and a hydraulic motor mounted on the platform at the opposite side of the gear member, each of said motors having a drive gear aligned with the gear member for intermeshing engagement therewith, and a rotary screw means mounted on the vehicle and engageable with the platform for longitudinally adjusting the platform for selectively moving the gear of either motor into intermeshing engagement with the pump gear member to drive the pump from said motor.

3. In a pumping system for admitting or removing liquid from a vehicle mounted tank, a reversible liquid pump having an open connection with the tank, a hydraulic circuit including a reversible fluid motor mounted on the vehicle, a reversible electric motor mounted on the vehicle, means for operatively connecting the pump to either motor to be driven thereby in forward or reverse directions dependent on directional operation of the motor to which it is connected, a shiftable control mechanism for shifting the fluid motor between forward and reverse operation, a reversing switch electrically connected to the electric motor for converting said motor between forward and reverse operation, a switch control arm on said switch, and said switch control arm being connected to the shiftable control mechanism for operation thereby so that directional operation of the pump is controlled through said shiftable control mechanism regardless of which motor the pump is operatively connected to.

4. The subject matter of claim 3 wherein the shiftable control mechanism comprises a two-way valve on the fluid motor for controlling the fluid flow to the motor, a valve control arm on the valve, a manual control fulcrumed on the vehicle, and a rigid link connecting the manual control and the valve control arm.

References Cited in the file of this patent

UNITED STATES PATENTS

| | | |
|---|---|---|
| 1,167,509 | MacDonald | Jan. 11, 1916 |
| 1,435,527 | Judelson | Nov. 14, 1922 |
| 1,497,575 | Menge | June 10, 1924 |
| 1,522,752 | Shield | Jan. 13, 1925 |
| 2,258,103 | Scheider | Oct. 7, 1941 |
| 2,557,933 | Beaman et al. | June 26, 1951 |
| 2,580,332 | Teetor | Dec. 25, 1951 |